(12) United States Patent
Monacchi

(10) Patent No.: US 9,447,592 B2
(45) Date of Patent: Sep. 20, 2016

(54) ECO-ACOUSTIC THEATRE

(71) Applicant: David Monacchi, Pesaro (IT)

(72) Inventor: David Monacchi, Pesaro (IT)

(*) Notice: Subject to any disclaimer, the term of this patent is extended or adjusted under 35 U.S.C. 154(b) by 0 days.

(21) Appl. No.: 14/770,349

(22) PCT Filed: Feb. 26, 2014

(86) PCT No.: PCT/IT2014/000056
§ 371 (c)(1),
(2) Date: Aug. 25, 2015

(87) PCT Pub. No.: WO2014/132280
PCT Pub. Date: Sep. 4, 2014

(65) Prior Publication Data
US 2016/0002939 A1    Jan. 7, 2016

(30) Foreign Application Priority Data
Feb. 26, 2013   (IT) .............................. AN2013A0041

(51) Int. Cl.
*E04H 3/30* (2006.01)
*E04H 3/22* (2006.01)
(Continued)

(52) U.S. Cl.
CPC ............... *E04H 3/30* (2013.01); *E04B 1/3211* (2013.01); *E04B 1/8209* (2013.01); *E04F 13/0867* (2013.01); *E04F 13/12* (2013.01); *E04H 3/22* (2013.01); *G03B 21/565* (2013.01); *G03B 21/606* (2013.01); *G03B 31/00* (2013.01); *G03B 37/04* (2013.01); *G03B 42/08* (2013.01); *H04R 5/02* (2013.01); *E04B 2001/8263* (2013.01)

(58) Field of Classification Search
CPC ..... E04H 3/30; E04B 1/3211; E04B 1/8209; E04B 2001/8263; E04F 13/0867; G03B 31/00; G03B 21/565; G03B 37/04; H04R 5/02
USPC ............. 52/6, 8, 80.1, 80.2, 81.1, 81.2, 81.3
See application file for complete search history.

(56) References Cited

U.S. PATENT DOCUMENTS

| 2,273,074 A | * | 2/1942 | Waller ................... G03B 21/56 |
| | | | 359/451 |
| 4,227,047 A | | 10/1980 | Horne |

(Continued)

FOREIGN PATENT DOCUMENTS

| DE | 295 07 524 U1 | 7/1995 | |
| DE | 20 2009 003 309 U1 | 7/2009 | |
| WO | WO 9201132 A1 * | 1/1992 | ............... E04H 3/30 |

OTHER PUBLICATIONS

Rosborough, John, International Application No. PCT/IT2014/000056, "International Search Report," May 11, 2014, 5 pages.

*Primary Examiner* — Brian Glessner
*Assistant Examiner* — Adam Barlow
(74) *Attorney, Agent, or Firm* — LaBatt, LLC

(57) ABSTRACT

An Eco-acoustic Theater is a truncated-spherical architectural structure appropriate for listening three-dimensional reconstructions of authentic natural soundscapes and eco-acoustic compositions. It is comprised of: a support structure that holds an external soundproof covering and an internal sound absorbing paneling; terraces of cylindrical concentric steps with decreasing or increasing diameter going upwards, built on grating; an annular screen placed onto the internal surface as to surround the terraces; loudspeakers embedded inside the support structure which convey distinct sound signals towards the terraces to reconstruct three-dimensional soundfields of acoustic ecosystems of primary rainforests (recorded or in streaming); projectors fixed to the said support structure to cast towards the said screen a real-time spectrogram of the average sound signal emitted by the loudspeakers.

14 Claims, 14 Drawing Sheets

(51) Int. Cl.
  *E04B 1/32* (2006.01)
  *E04B 1/82* (2006.01)
  *E04F 13/08* (2006.01)
  *E04F 13/12* (2006.01)
  *G03B 21/56* (2006.01)
  *G03B 21/606* (2014.01)
  *G03B 31/00* (2006.01)
  *G03B 37/04* (2006.01)
  *G03B 42/08* (2006.01)
  *H04R 5/02* (2006.01)

(56) References Cited

U.S. PATENT DOCUMENTS

| | | | | |
|---|---|---|---|---|
| 4,631,867 A * | 12/1986 | Reed | ............... | E04B 1/164 264/32 |
| 4,642,945 A * | 2/1987 | Browning | ............... | A63J 25/00 352/36 |
| 4,750,807 A * | 6/1988 | Chamayou dit Felix | ............... | G03B 21/56 359/451 |
| 4,885,878 A * | 12/1989 | Wuu | ............... | E04H 3/22 348/121 |
| 5,097,640 A * | 3/1992 | Skolnick | ............... | E04B 1/3211 434/286 |
| 5,140,790 A * | 8/1992 | Modglin | ............... | E04B 1/3211 52/586.1 |
| 5,724,775 A * | 3/1998 | Zobel, Jr. | ............... | E04B 1/3211 359/443 |
| 6,128,130 A * | 10/2000 | Zobel, Jr. | ............... | G03B 21/56 359/443 |
| 8,307,605 B2 * | 11/2012 | McCarty | ............... | E04B 7/08 52/745.07 |
| 8,926,441 B2 * | 1/2015 | Fox | ............... | H04R 1/02 472/136 |
| 2006/0274413 A1 | 12/2006 | Hopper et al. | | |
| 2007/0193123 A1 * | 8/2007 | Magpuri | ............... | E04H 3/22 52/8 |

\* cited by examiner

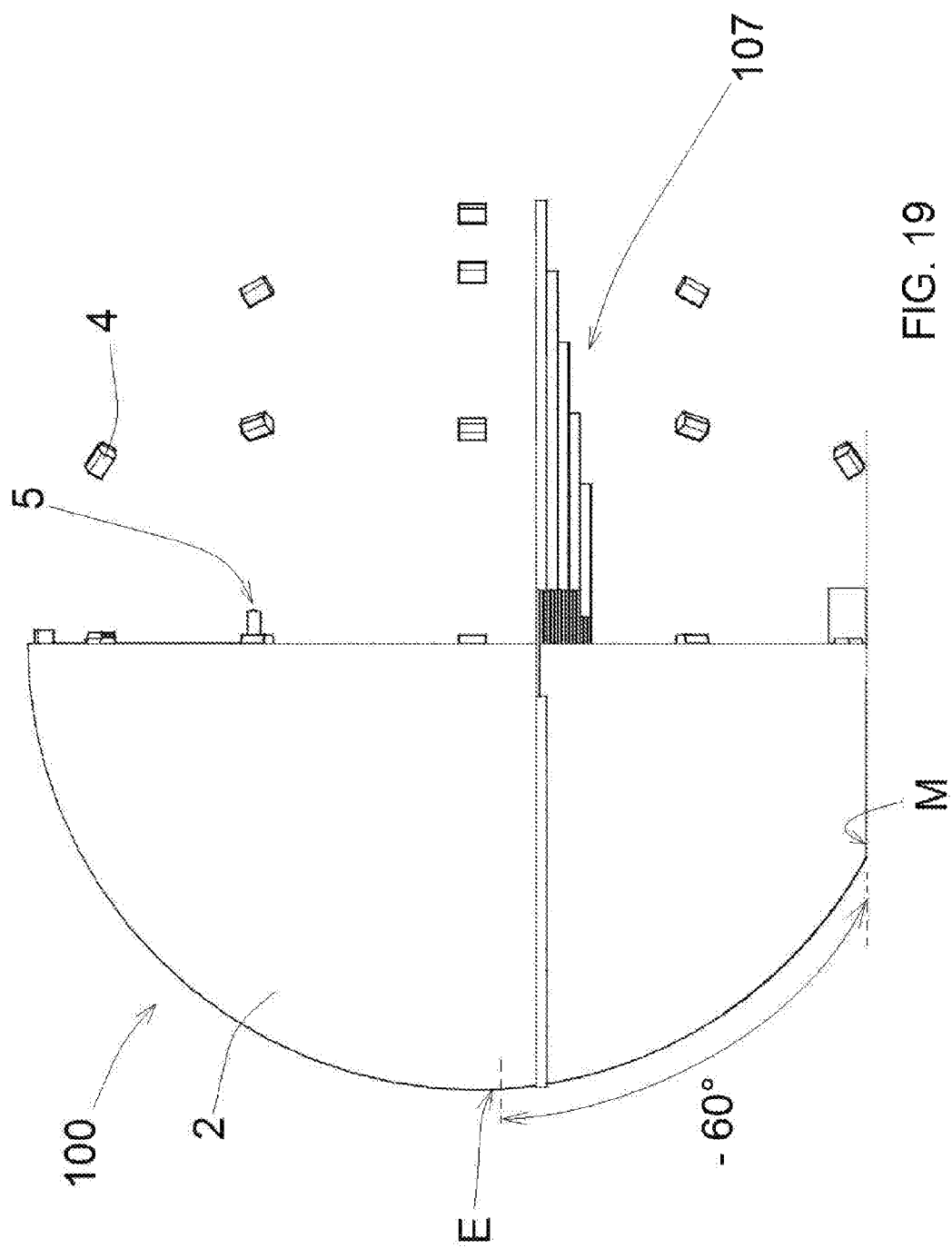

ECO-ACOUSTIC THEATRE

REFERENCE TO RELATED APPLICATIONS

The current application is a US national application of PCT Patent Application No. PCT/IT2014/000056, titled "ECO-ACOUSTIC THEATRE," which was filed on 26 Feb. 2014, and which claims priority to Italian Patent Application No. AN2013A000041, which was filed on 26 Feb. 2013, both of which are hereby incorporated by reference.

TECHNICAL FIELD

This request for a patent for an industrial invention is in regards to an Eco-acoustic Theatre appropriate for listening three-dimensional reconstructions of authentic natural soundscapes and eco-acoustic compositions.

BACKGROUND ART

Current theatres are not suitable for listening to real acoustic ecosystems in that they do not provide a systematic approach for a uniform three-dimensional sound reproduction. As a matter of fact, all traditional theatres, including cinemas, IMAX halls, and planetariums lack speaker systems capable to uniformly cover the spherical (or, at least hemispherical) space surrounding the audience, which is a necessary condition for a full sound reproduction of ecosystems.

The reason why existing theatres do not have this feature is because they were constructed primarily for the viewing of imagery contents which, considered the frontal direction of human sight, offer the spectator a specific frontal view of the subject matter. Such a directional view, in the case of IMAX theatres, is expanded laterally to 180° and in some planetariums the space can be hemispherical and yet, without an isotropic and spherically uniform audio system. The audio systems that exist in theatres today are in fact oriented to offer a preferential directional sound that is consistent with the line of vision. Also, these sound systems are adapted to the movie theatre walls (generally rectangular or square floor plan) and therefore the speakers are not equidistant from the centre of the theatre nor between them. Furthermore, theatres are constructed along sound reproduction standards (e.g. Mono, Stereo, Dolby surround 3.0, 3.1, 4.0, 4.1, 5.0, 5.1, 6.0, 6.1, 7.0, 7.1, THX 10.2 and 12.2, Hamasaki 22.2). Taking into account the said preferential sound orientation to accompany what is seen (frontal sound elements that must combine with the visual elements on the screen and supplemental lateral and rear sound channels with discrete sound content arranged two dimensionally), existing theatres are not satisfactory for a systematic three-dimensional full-periphonic listening experience (equal recontruction of virtual sound sources from all directions—axis X, Y and Z—and correct perspective reconstruction—absolute and relative distances of sound objects). This stands as the optimal and essential condition for a homogeneous reproduction of natural soundscapes as they are found in real ecosystems where sound sources are located all around, above and below the listening position and where distances are very important ecological factors and perceptual cues.

US2007/193123 describes a theatre that consists of a parallelepiped supporting structure, concentric cylindrical benches and steps, a circular band screen that surrounds the benches, speakers and projectors. However, this type of theatre poses problems of acoustics due to the materials used and the form of the supporting structure, as well as for the speaker collocation.

DE 295 07 524 describes a theatre that provides a parallelepiped supporting structure made of sound absorbing materials.

SUMMARY OF THE INVENTION

The aim of this invention is to overcome the inconveniences of the prior art, offering an Eco-acoustic Theatre that is comfortable, efficient, acoustically isotropic and omnidirectional and that is able to optimize the three-dimensional sound reproduced from acoustic ecosystems, and present at the same time visual spectrograms of the acoustic ecosystems (as they unfold in time) on a section of the entire circular space of the theatre.

Another aim of this invention is to create an Eco-acoustic Theatre where ecosystems of highest biodiversity, in their acoustic component, are reproduced through optimized playback of audio recordings or real-time streaming from the world's primary surviving rainforests.

A further aim of this invention is to create a small arena space at the centre of the Eco-acoustic Theatre in order to accommodate one or more electroacoustic performers, who will supplement in real-time the natural ecosystems that are made visible by the spectrogram projection, accompanied by electroacoustic music.

These objectives were obtained accordant with the invention and its characteristics listed in the attached independent claim 1.

The benefits of the realization of the invention can be found in the dependent claims.

The Eco-acoustic Theatre according to the invention includes:
  A supporting structure;
  Terraces essentially shaped as concentric cylinders with a decreasing diameter going either upwards or downwards (according to two different options), placed within the before mentioned supporting structure in order to have the greatest possible number of spectators near the three dimensional centre of the theatre;
  Annular screen set within the internal paneling of the structure so as to surround the terraces;
  Speakers sustained by the said supporting structure and placed equidistant from the center of the theatre in order to convey towards the said terraces a multitude of diverse and interdependent acoustic signals that reconstruct the real three-dimensional natural soundscapes at the centre;
  Projectors sustained by the said supporting structure, directed towards before mentioned screen, presenting a spectrogram of the average sound emitted by the speakers.

The innovative characteristics of this Eco-acoustic Theatre are the following:
  The supporting structure sustains an external sound proof covering and an inner sound absorbing paneling; it has the form of a truncated sphere with a horizontal plane;
  The speakers and projectors are held by the said supporting structure; and
  The cylindrical steps of the terraces have an axis which coincides with the vertical axis passing through the north pole of the sphere.

Such an Eco-acoustic Theatre allows for a systematic approach, which is fundamental for the correct reproduction of complex acoustic ecosystems where elements of each species vocalize from precise sectors of the three dimensional space around, above and below the listening area. It is this spatial definition and homogeneity of the sound reproduction that allows the listener within the Eco-acoustic theatre to discern each single sound and virtually reconstruct them in their original allocation. This characteristic of the invention is strictly correlated to the omnidirectional space-preservative microphone technique used in the field, which must be carefully chosen for compatibility with the needs of an Eco-acoustic Theatre. In movie theatres, planetariums and similar spaces, the sound contents are generally derived from sound archives or are recorded with space-selective techniques (monophonic, stereophonic and planar surround etc.), to then be mixed in a sound studio as discrete sound elements. On the contrary, the ecosystems reproduced for an Eco-acoustic Theatre are already recorded in the field, in a uniform and isotropic three-dimensional way.

This characteristic presents the opportunity to reproduce, with extremely high definition, the origin of direction, the distance and dimension of any acoustic source originating from the original ecosystem and therefore creating an immersive space specific to that kind of sound contents (biophonies and geophonies of a complex habitat).

In this sense, the operating principle characterizing traditional theatres, according to which sound is subservient to the dominant visual aspects, is inverted in the Eco-acoustic Theatre: here, sound is dominant in respect to the visual element and arrives in a uniform and isotropic way from a three dimensional space that is wider than a hemisphere.

Conversely, the visual element is limited to a cylinder where nothing more than the spectrogram of the same sounds is displayed. The visual aspect, therefore, is only an analytical and explicative component for the sound.

BRIEF DESCRIPTION OF THE DRAWINGS

Further characteristics of the invention will appear better defined after the detailed description that follows, which refers to the drawings attachments. The drawings have only illustrating and not limiting value, where:

FIG. 19 is a section view of the theatre from FIG. 16.

DETAILED DESCRIPTION OF THE INVENTION

The theatre is described with the aid of the drawings according to the invention plan and is indicated on the whole with the reference number (100).

Figure 1:
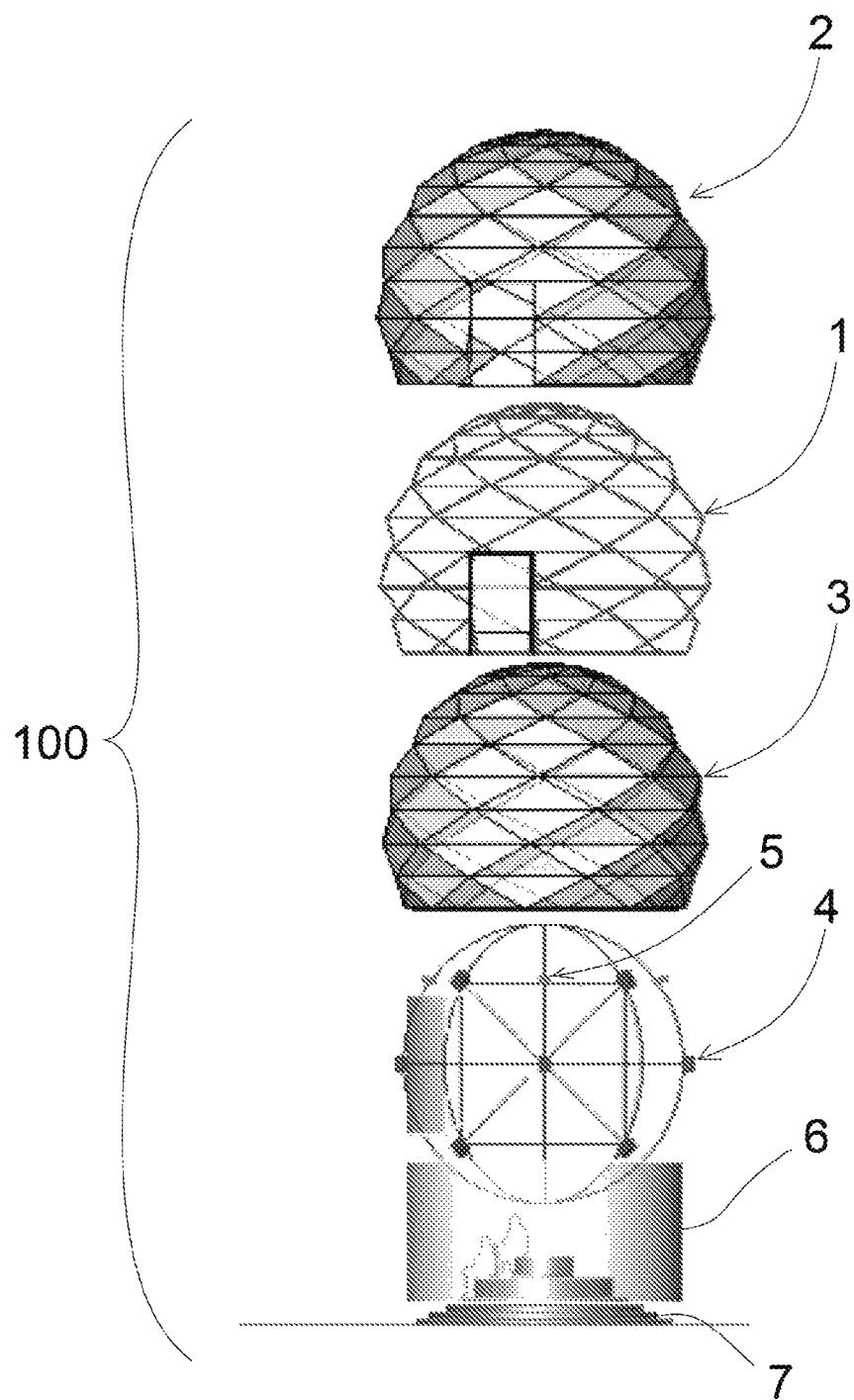
FIG. 1 is a synthetic, illustrative exploded view of the structural elements of the Eco-acoustic Theatre, done in accordance to the invention plan.
Figure 3:
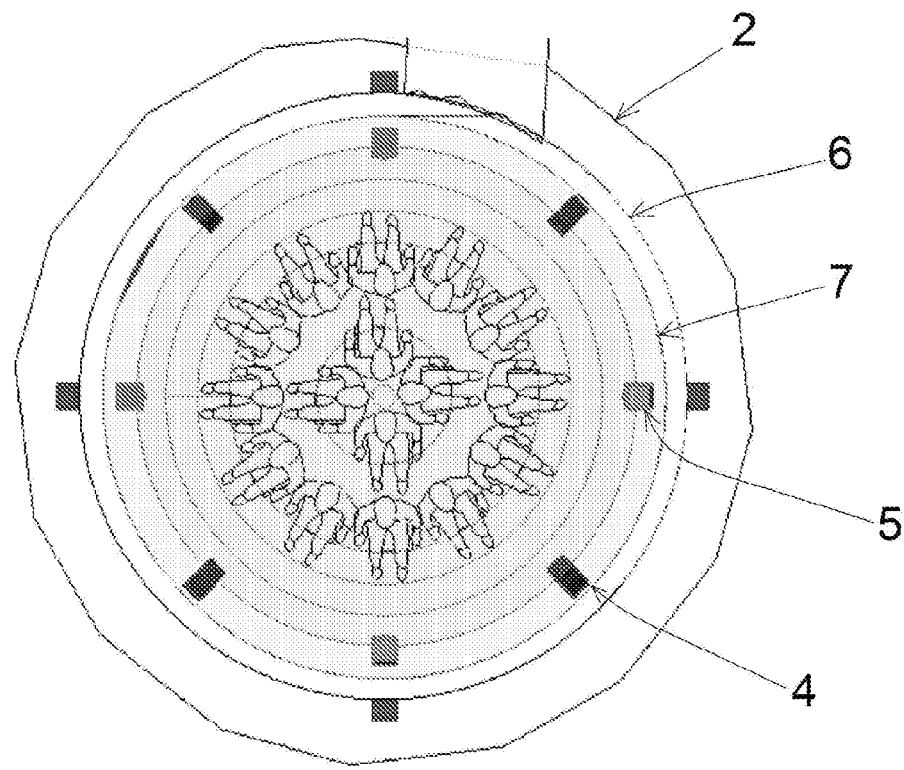
FIG. 3 is a view of the theatre map (dimensional option: 7 meters in diameter), done in accordance to the invention plan.

As of now in reference to FIGS. 1 and 3, the theatre (100) consists of:

A sustaining structure (1) that supports an external covering (2) and an internal covering (3);

Terraces (7) for the most part concentric cylinders with a decreasing or increasing diameter along to the upper sections, placed within the internal covering (3);

An annular screen (6) set within the internal covering (3) so as to surround the terraces (7);

Speakers (4) supported by the structure (1) for directing the sound towards the said terraces (7).

Projectors (5) placed on the structure (1) for directing the video signal towards the said screen (6).

The main technical problem is how to arrange the three-dimensional listening space so that the audience is arranged in a systematized, symmetric, aurally relevant for the 3D-sound reconstruction, immersive and comfortable way, thus organizing the most of the audience in proximity to the equator and to the center of the theatre.

Figure 2:
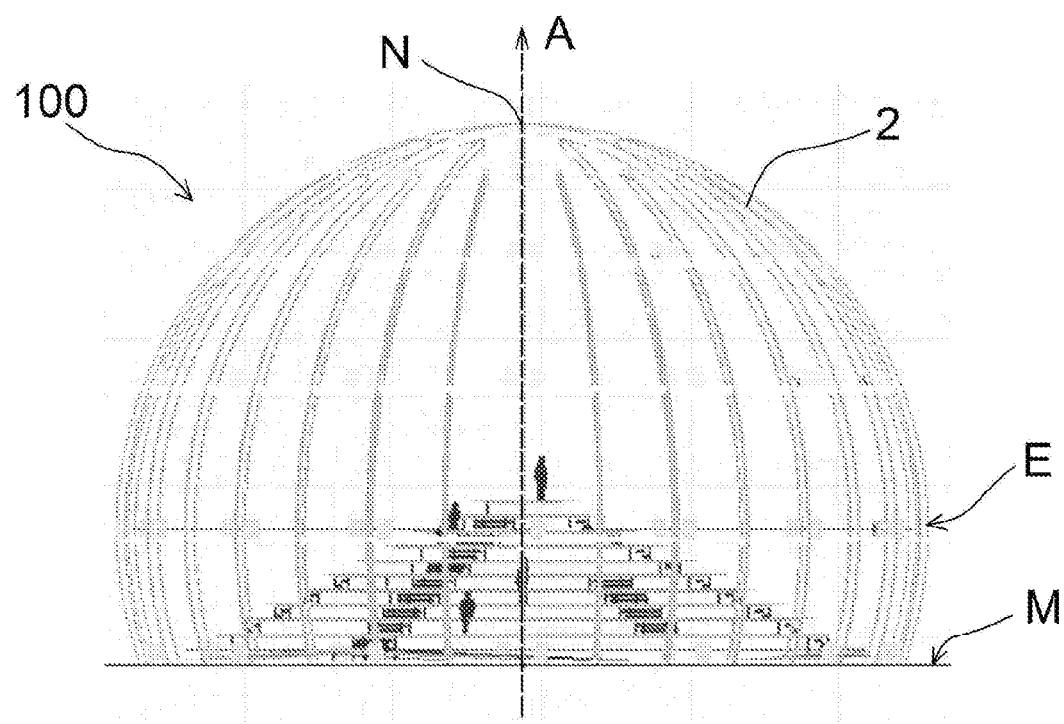
FIG. 2 is a view of the back of the theatre (dimensional option: 26 meters in diameter), done in accordance to the invention plan.
Figure 6:
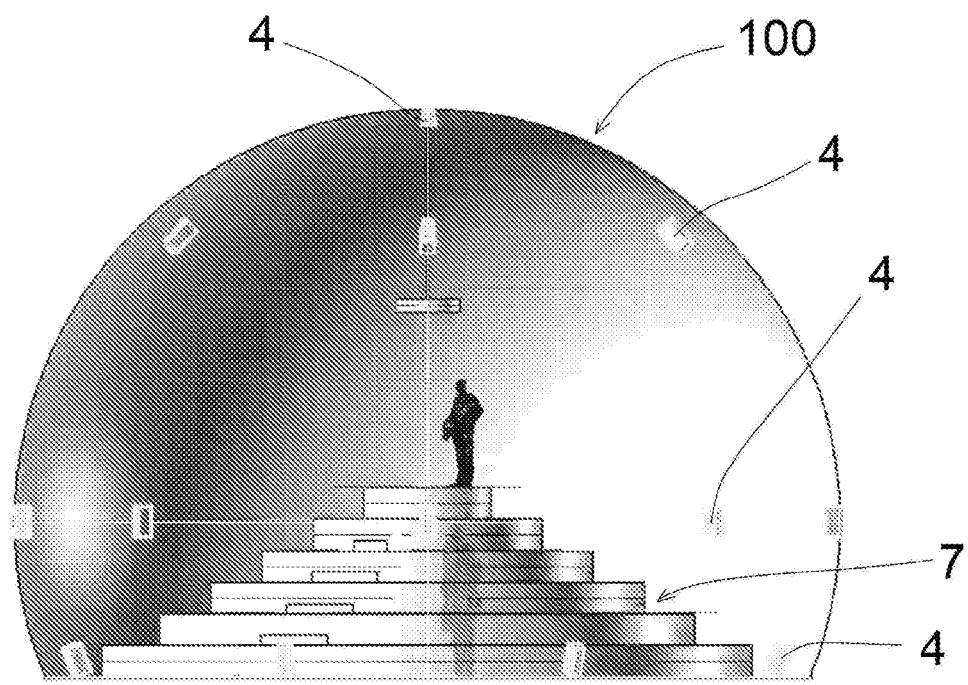
FIGS. 6 and 7 are, respectively, a section view and a survey of the theatre (dimensional option: 26 meters in diameter), that illustrate the positioning of the speakers.

For the purpose, the elements: external covering (2) the support structure (1) internal paneling (3) have a geometric form that is essentially a truncated sphere. Referring to FIG. 2 and FIG. 6, the sphere is cut by a horizontal plane that corresponds to a parallel (M) of at least 20° below the equator (E). In this way the central part of the structure will correspond to the north pole (N) and you can note a vertical axis (A) passing through the north pole. The horizontal plane, that severs the sphere, corresponds to the ground or base on which the theatre is constructed (100).

Figure 4:
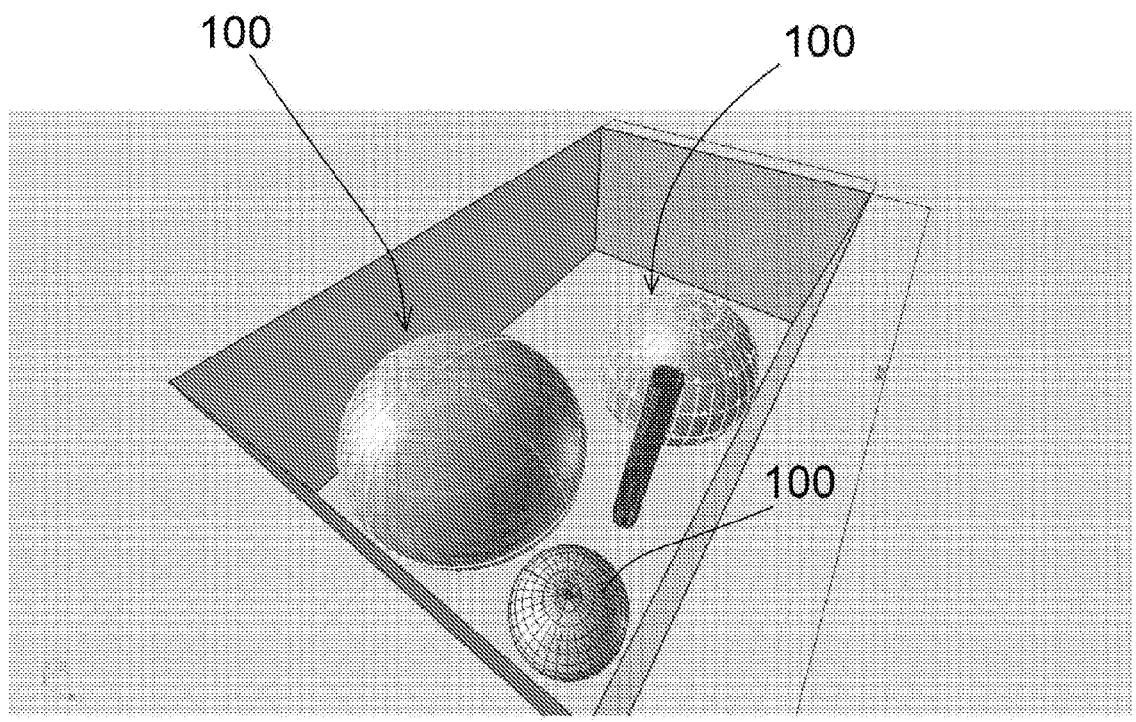
FIG. 4 is a view in perspective, illustrating three versions of the theatre according to the invention plan in different dimensions.

This truncated sphere structure is completely scalable to conform to the environmental situation where the theatre is hosted. It can, in fact, be foreseen several truncated sphere structures with variable diameters of for example 7 to 30 meters, as is shown in FIG. 4, or even diameters smaller than 7 meters.

The support structure (1) is preferably to be constructed using reticular beams, for example metal tubes, but can also be a modular structure of wood and/or metal. The support structure (1) serves to sustain the exterior covering (2) and the internal cover (3) and it functions to hook on and as anchorage for the electroacoustic equipment (speakers (4), projectors (5) and electric wiring).

The external cover (2) is made of soundproof paneling for example metal laminates. The external cover (2) serves as an acoustic insulation (from approximately 35 dB to 45 dB, depending on the external context and necessary insulation) from and towards the outside world and therefore it becomes suitable for the reproduction of very delicate acoustic ecosystems, usually comprised of low acoustic energy.

The internal cover (3) is made up of sound absorbing materials, as for example open-cell acoustic foam. The internal covering (3) serves as an acoustic absorbent for the sound produced by the speakers (4). This condition of high internal sound absorption (the average coefficient being approximately 0.7-0.9 Sabine) is essential in order to eliminate as much as possible the internal sound reflection so that the sound received by the audience is coming only from the speakers (4), allowing for a three-dimensional control of the soundfield and the perceptual reconstruction of virtual soundscapes in proximity of the central area of the theatre (100).

Figure 5:
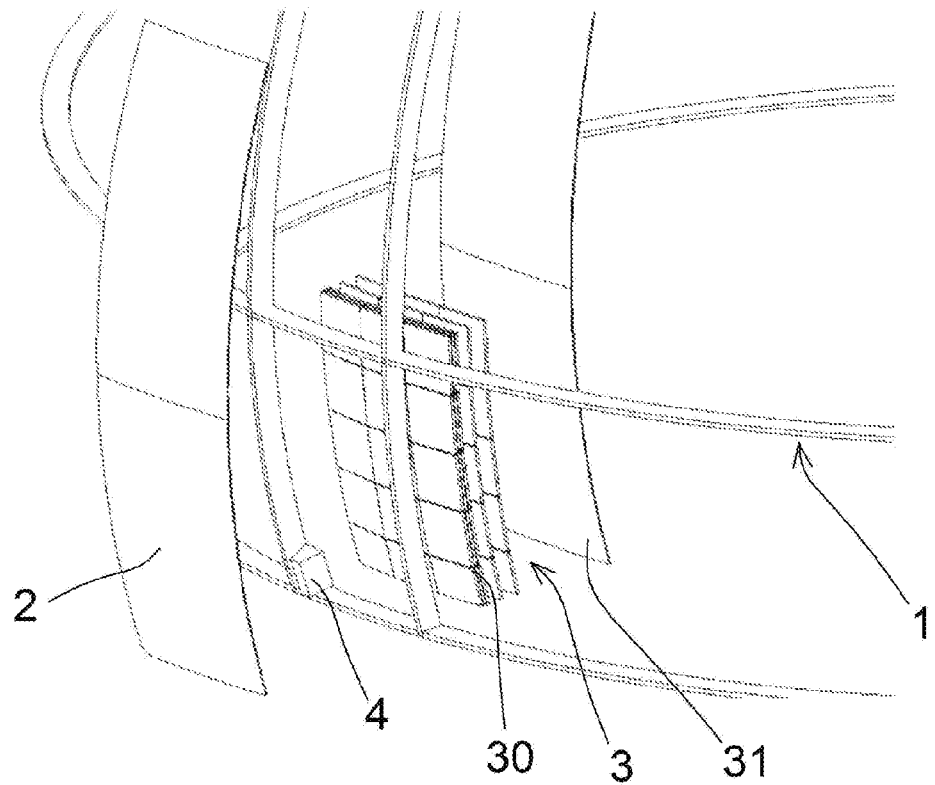
FIG. 5 is a view in perspective, illustrating an exploded diagram of the inner and outer coverings of the theatre according to the invention plan.

The speakers (4) are fixed to the supporting structure (1). They are embedded, in the sound absorbing material of the inner cover (3) but free on the frontal face. FIG. 5 shows how one of the speakers (4) is placed into the internal cover (3) that is made up of several sound absorbing layers (30) with an internal sound-transmitting facing (31).

Figure 8:
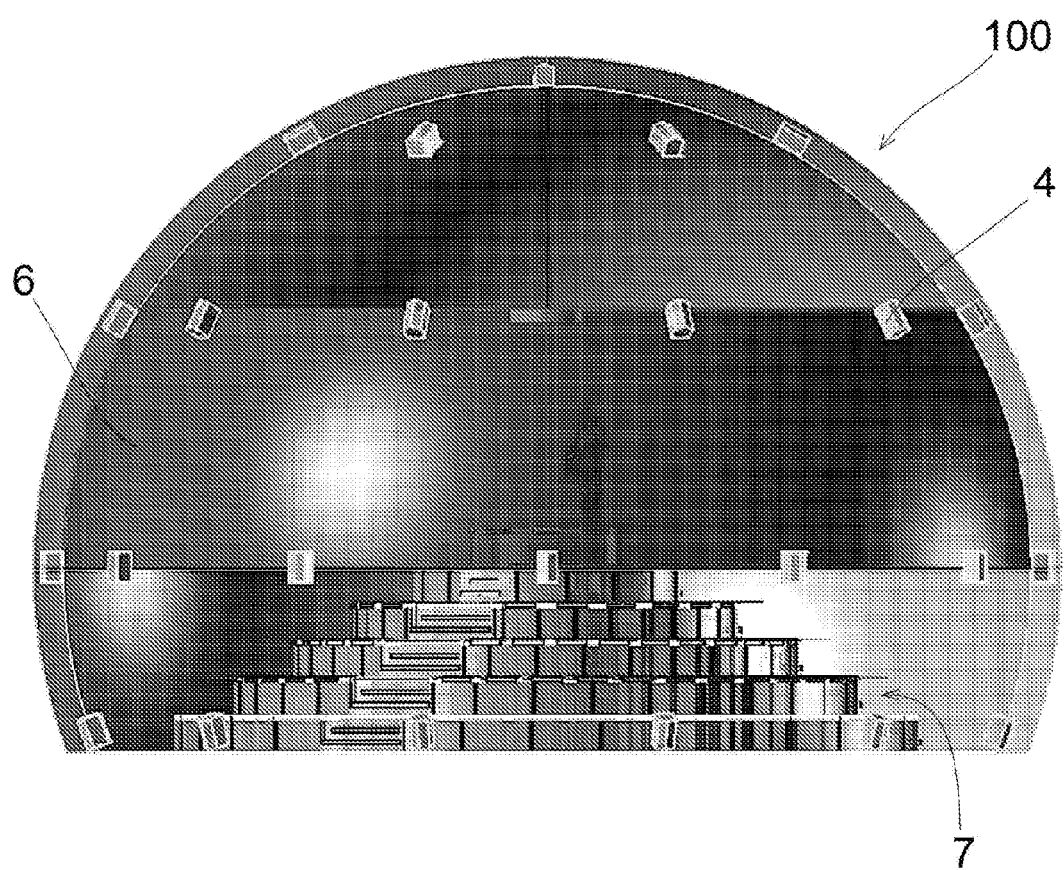
FIG. 8 is a section view of a variant of 6 and 7 illustrating the positioning of 41 speakers, plus, the annular screen.
Figure 9:
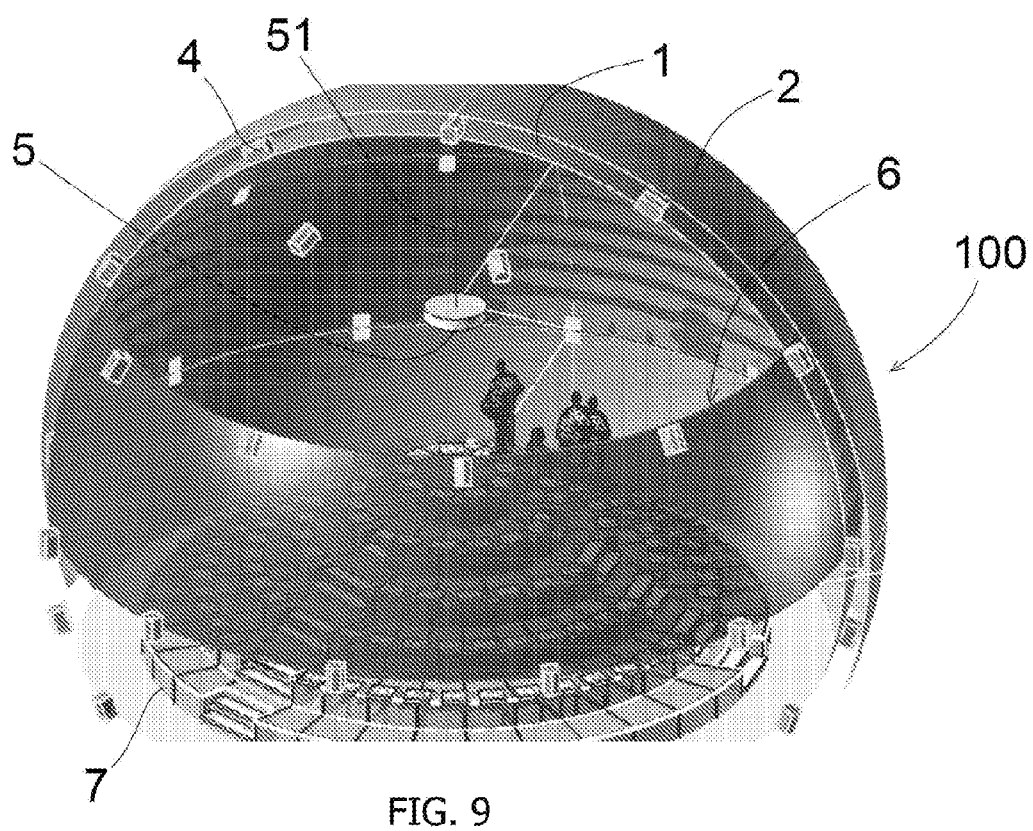
FIGS. 9 and 10 are two perspective views, partially sectioned, illustrating the annular screen of the theatre according to the invention plan.
Figure 10:
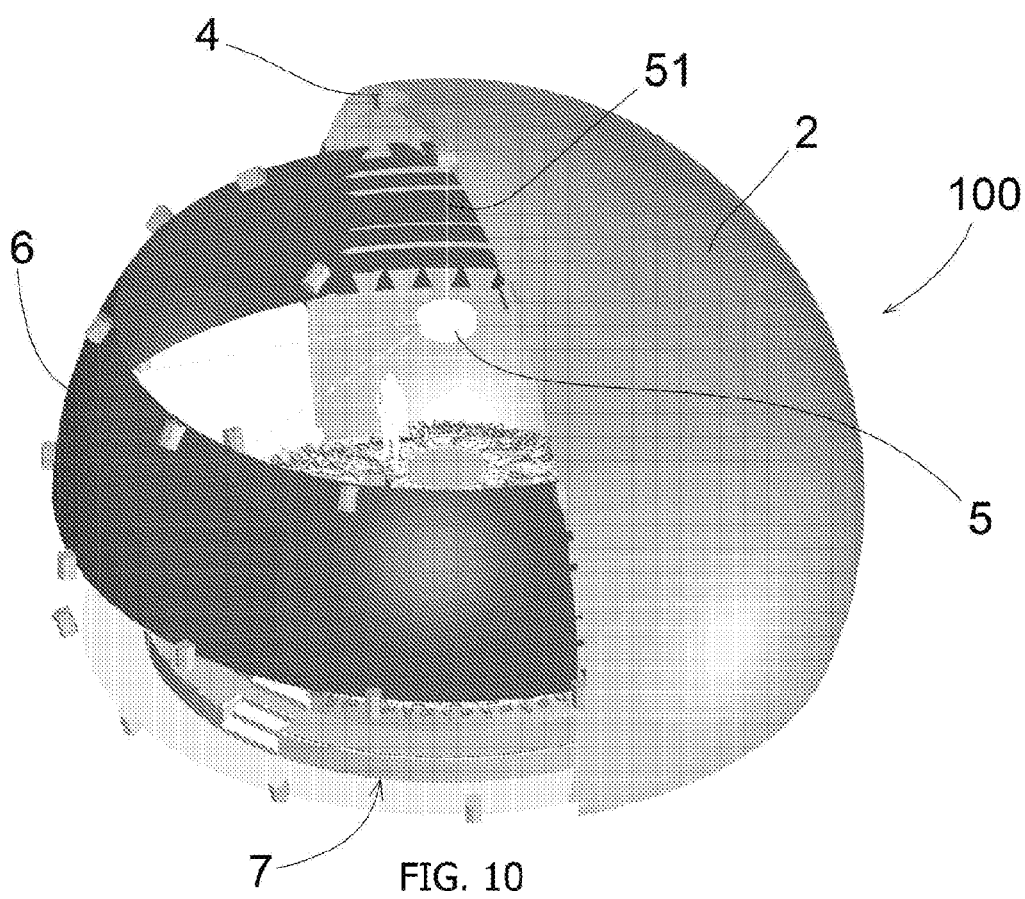

In reference to FIGS. 8 and 9, a projector system (5) is hung from the supporting structure (1) by a wire or vertical rod (51) corresponding to the north pole of the truncated sphere. In a favorable manner the projectors (5) are fitted on a support on the vertical axis (A) passing by the north pole.

Figure 11:
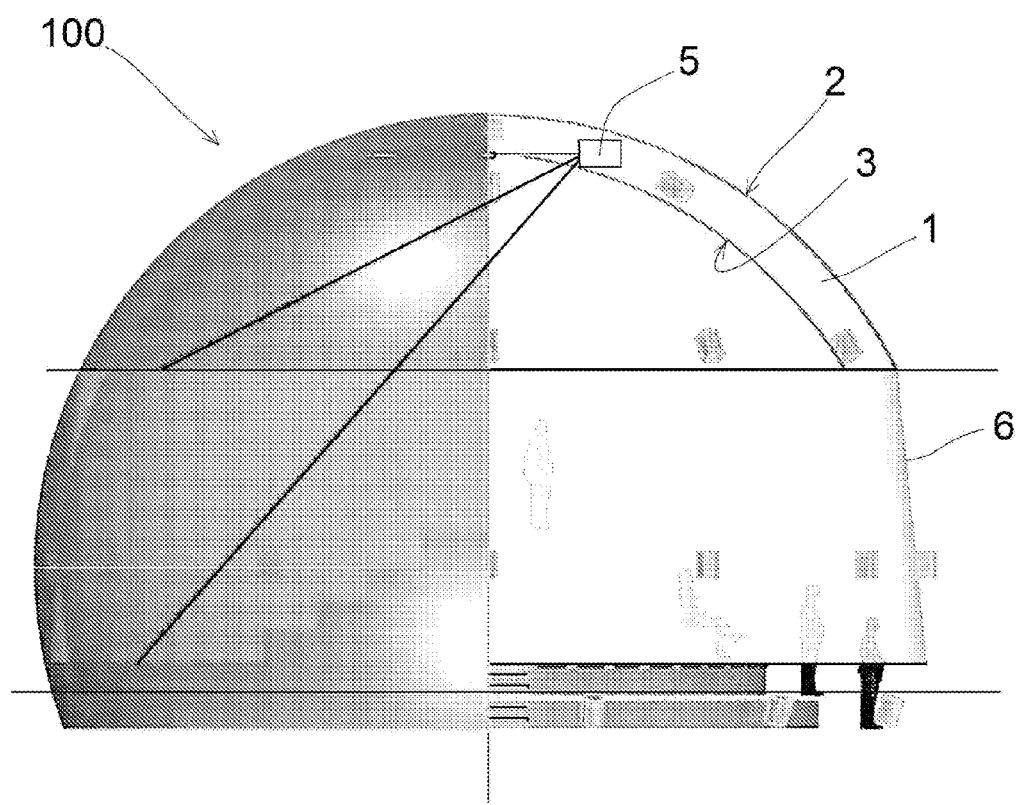
FIG. 11 is a schematic, partially sectioned, frontal view of a variant of FIGS. 8 and 9 illustrating a projector fixed to the cap of the theatre ceiling and a truncated cone shaped screen.

In reference to FIG. 11: a more advantageous option for the larger Eco-acoustic Theatres, is to incorporate the projectors (5) directly into the depth of the upper dome formed by the supporting structure (1) and the internal cover (3).

In addition, in this option the screen (6) is truncated-conical and it can become transparent (for example: Free Format) and completely invisible in the dark, thus creating, through proper elaborations of the spectrograms, a three dimensional illusion. (the screen (6) has the principle function of displaying the sonographic spectrographic analysis done in real time of the ecosystems that can be heard within the Eco-acoustic Theatre. In way it offers a clear and intuitive means for understanding the structures and the ecological niches of the habitat sounds. The screen has the form of a annular band (6) preferably with a spherical ring cut by two horizontal planes at the equator and 30° above the equator. However, the screen (6) can also be cylindrical or truncated-conical and expand or be placed, depending on the dimension of the theatre, up to 45° above and 20° below the equator. In all cases, the screen (6) has a vertical axis which corresponds to the vertical axis (A) passing by the north pole of the sphere.

The screen's diameter (6) is greater than the diameter of the base of the terraces (7) so that the screen (6) can surround the terraces (7). As an example the screen (6) in the drawings is fixed to the support structure (1) in an area between the equator and 30° north of the equator.

The screen (6) in the cylindrical or truncated-conical version is fixed above and below to the theatre's supporting structure (100).

The screen (6) is white or black for projections and is usefully micro-perforated to allow the sound coming from the speakers (4) to cross over. The screen (6) can also be made of transparent plastic with silver crystals (Free Format type) for a three dimensional illusion.

Figure 7:
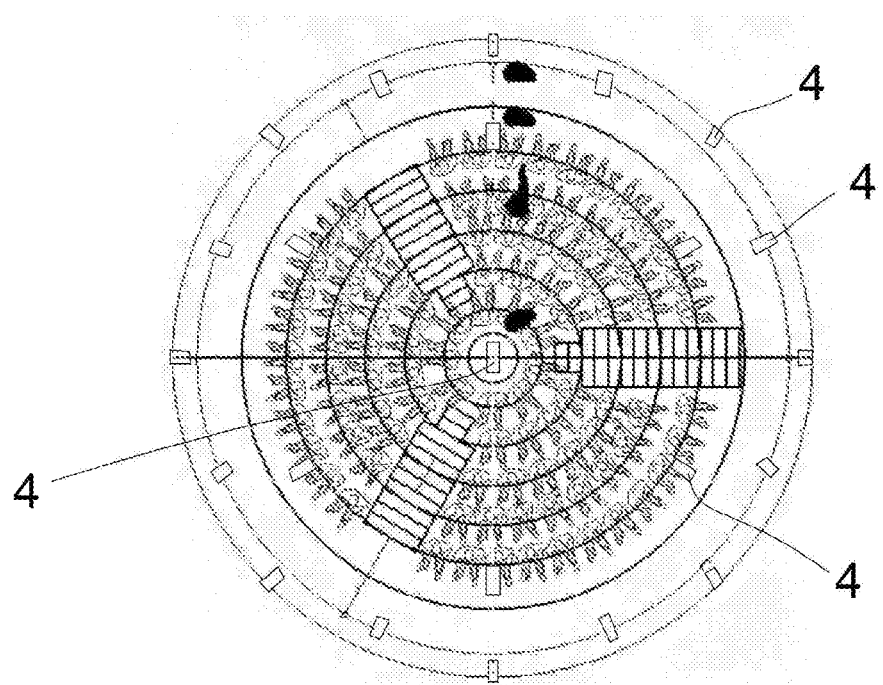

In reference to FIGS. 6 and 7, the theatre (100) has been designed to have a N. speakers placed, in a simple and efficient way, equidistant from the center of the theatre. The number of speakers (4) is variable according to the different spatial resolution needed.

It is important that the speakers (4) are, as much as possible, equally spaced one from each other so as to approximate a uniform coverage of the surface of the sphere and to create an environment that, is as much as possible, isotropic for what regards the emission of sound in 3-D along 360°. A profitable solution to approximate the ideal platonic solids configuration (i.e. vertexes of a exahedron, dodecahedron or icosahedron) is to arrange the speakers onto rings equidinstant from each other. In this way speakers can be easily placed and their number can be easily scaled to the desired dimension of the theatre and the spatial resolution needed. Therefore according to the invention, the speakers (4) are placed on rings.

FIGS. 6 and 7 provide an example, of the realization of the theatre comprising the placement of 23 speakers, where:
  8 speakers are placed equidistantly from each other on the equator at an horizontal angular distance of 22.5° between them;
  8 speakers are placed equidistantly from each other on a parallel at 20° south of the equator (essentially at ground level).
  6 speakers are placed equidistantly from each other on a parallel at 45° north of the equator.
  1 speaker is placed at the north pole.

FIGS. 6 and 7 provide an example, of the realization of the theatre comprising the placement of 41 speakers, where:
  12 speakers are placed on the equator equidistantly from each other at an angular distance of 30° between them;
  12 speakers are placed equidistantly from each other on a parallel at 20° south of the equator (essentially at ground level) at an angular distance of about 30° between them
  10 speakers are placed equidistantly from each other on a parallel at 30° north of the equator at an angular distance of 36° between them;
  6 speakers are placed equidistantly from each other on a parallel at 60° north of the equator at an angular distance of 60° between them; and
  1 speaker in placed at the north pole.

Figure 12:
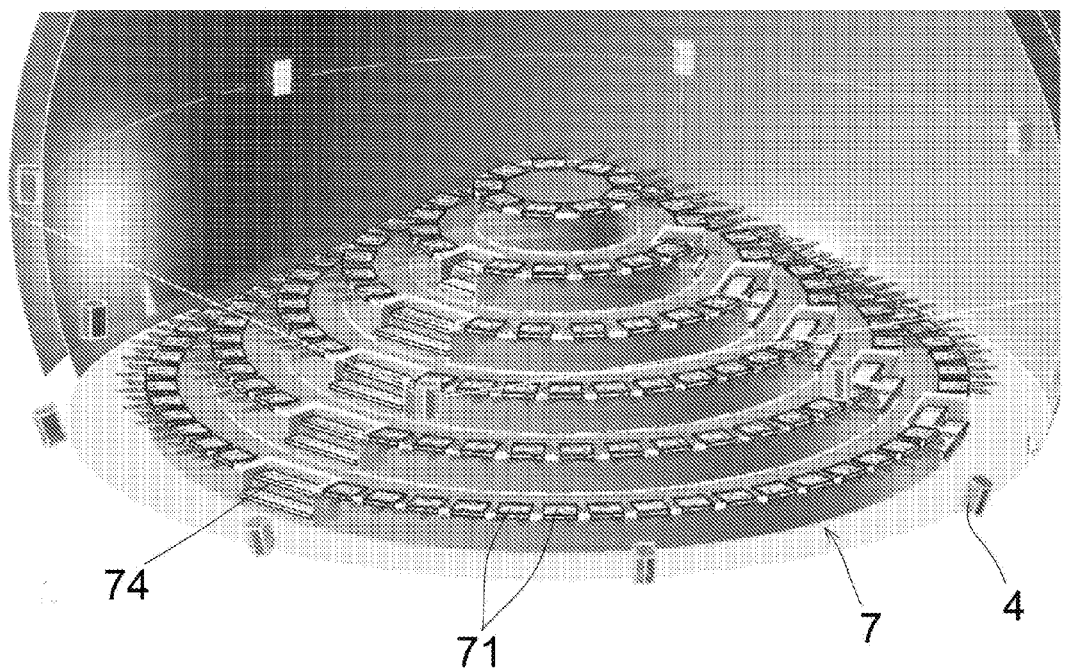
FIGS. 12 and 13 are two perspective views (dimensional option: 26 meters in diameter), partially sectioned, illustrating the realization of the theatre terraces in their first possible version, i.e. in the convex form, according to the invention plan.
Figure 13:
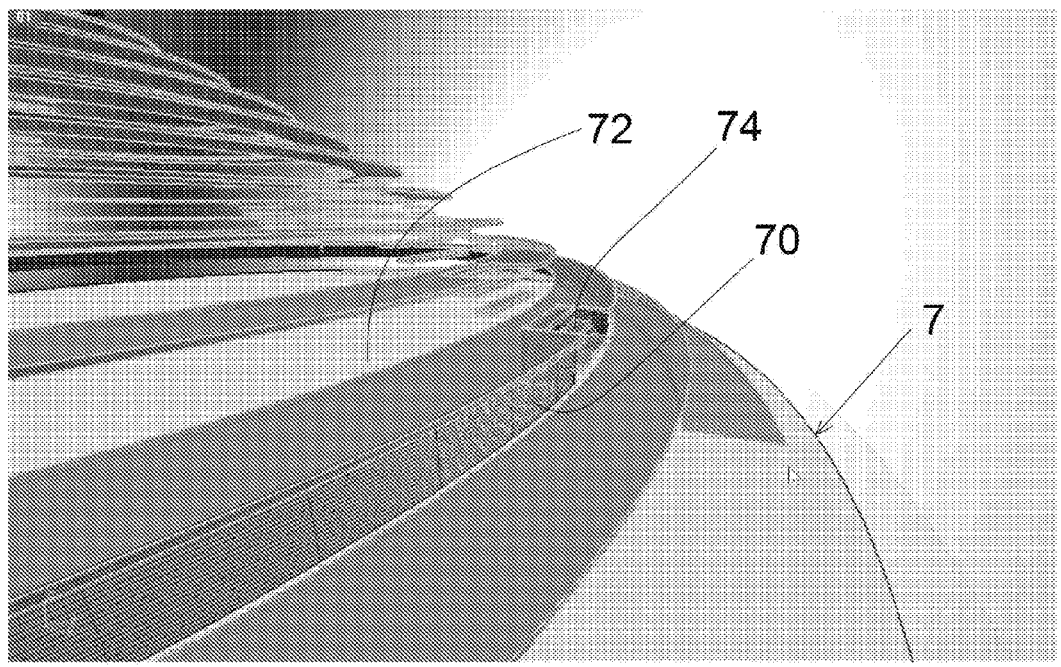

In reference to FIGS. 12 and 13, the seating system (7) of the theatre (100) is organized in concentric cylindrical terraces with a decreasing diameter along to the upper part. The axis of each cylindrical step coincides with the vertical axis (A) passing the north pole.

These terraces (7) optimize the seating of the greatest number possible of spectators in the central zone of the spherical system, without compromising their comfort and movement within the theatre. This original seating solution is very important for a correct immersive listening of the reconstruction of a three-dimensional sound environment.

Furthermore this seating solution of terraces makes it possible for the audience, unlike any other theatre devices, the contemporary presence of virtual sound sources coming from:
  a) from the entire bi-dimensional space of the azimuth—circular 360° plane at 0° elevation;
  b) from the entire upper hemispherical space—from elevation 0° to elevation 90°;
  c) from part of the inferior hemisphere—from elevation 0° until to −60°.

In reference to FIG. 13, the frontal and the treading surface part of each cylindrical step of the terraces (7) is made up of metal grating (70) or another micro-perforated material (Orsogril type). This feature allows for the transmission of sound without interference along the greatest part of the low and mid-high frequency spectrum. This condition is extremely important to allow the entire audience, in all sections of the theatre, to receive the greatest amount of direct sound coming from each of the speakers (4), so that it is possible to have a three-dimensional Ambisonic reconstruction that is as much homogeneous as possible.

Although in FIG. 13 only one grate is shown (70), it is to be understood that the grating is a part of each step of the terraces.

FIG. 12 illustrates the method of construction of the terraces (7) where singular seats are added (71), made of wood 45 covered in felt. Rather, in FIG. 13 there is an illustration of a project method where the treading surface of the terraces is left bare, made of grating or micro-perforated material.

The cylindrical terraces (7) are accessed by a series of stairs (74) inserted in the grating structure of the terraces. These stairs can vary in number (n.3, n.4, n.6) according to the dimensions of the theatre. Some of the stairs (74) are continuous and connect the base of the terrace (7) with the last step of the terrace above. Other stairs can be interrupted (see FIG. 2), that is that they begin at the base but do not reach the last step of the terrace.

Figure 14A:
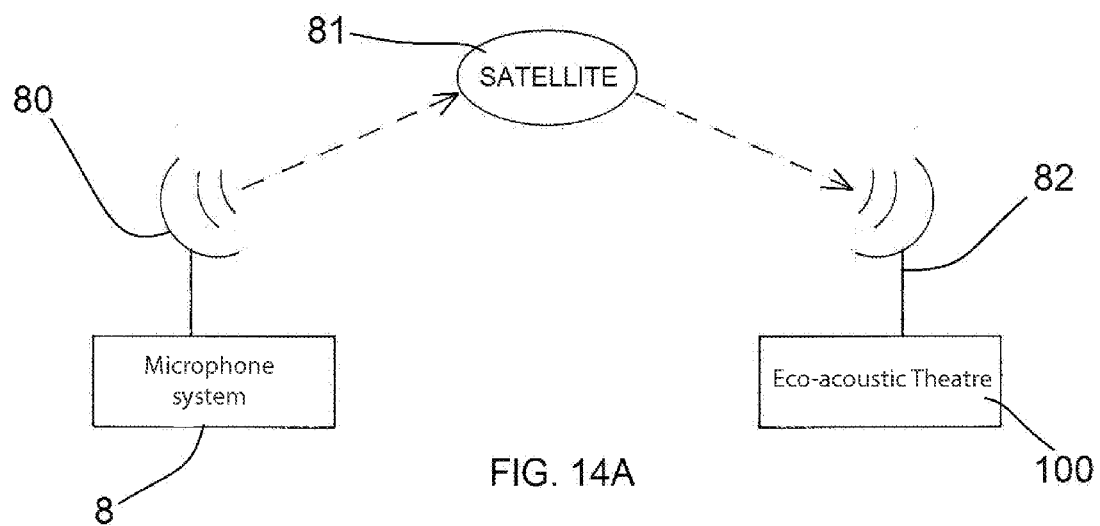
FIGS. 14A and 14B are two diagrams in blocks illustrating the real-time transmission of ecosystem signals to the theatre according to the invention plan.
Figure 14B:
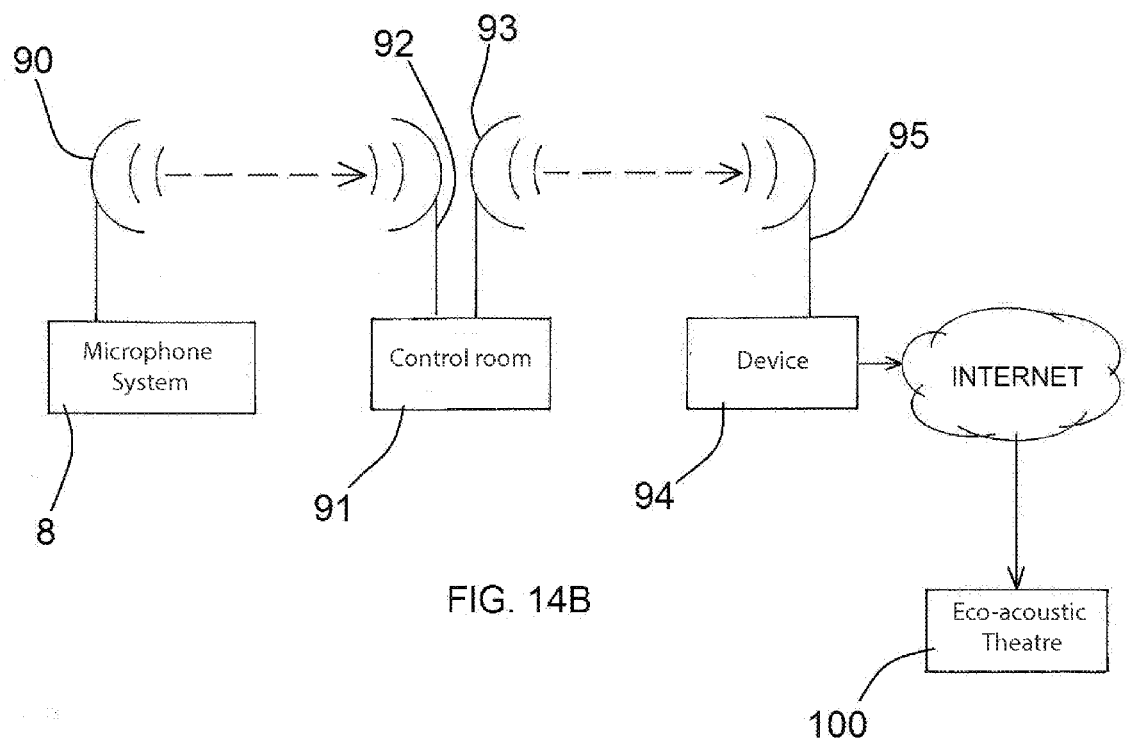

With reference to FIGS. 14A and 14B, the sound contents to be reproduced in the theatre (100) come from recordings of natural soundscapes (ecosystems of primary rainforests) or from real-time transmissions, originating from a system of microphones (8) placed in the forest. This kind of microphone system (8) allows for a 3-D omnidirectional type of recording with two distinct types of system working at the same time:

i. First-order Ambisonics, via a tetrahedral capsule or a spherical array of microphones—necessary to store the spatial information to then reconstruct a 3-D soundfield in the Eco-acoustic Theatre.
  ii. Binaural microphone head, for listening in 3-D with headphones (internet listening as a preview of the experience in the Eco-acoustic Theatre).

The entire surrounding habitats of the primary equatorial rainforests are transmitted in real-time in the theatre (100), using two alternative methods:

A. a transmission via satellite directly from the area of sound registration (FIG. 14 A);
  B. a transmission via radio and internet (FIG. 14 B).

In the case of satellite transmissions, the microphone system (8) is connected to an antenna (80) for satellite transmission that is passed on to the satellite (81). The theatre (100) has an antenna (82) for satellite reception that receives the signal sent by the microphone system (80).

As for transmission by radio and internet, the signal received by the microphone system (8) is sent, in low-frequency modulation by a radio transmitter antenna (90) to a control room (91) with a receiving antenna (92) that receives the signal in low frequency.

The signal is then modulated in high frequency and transmitted by an antenna transmitter (93) via radio in high frequency, from the control room (91) to the nearest city; here, a device (94) receives the transmitted signal by a receiving antenna (95) and sends out to the internet web six sound channels (4 channels of Ambisonics B-format W, X, Y, Z+2 channels L, R of binaural) with a band of about 6 Mbit/s.

Figure 15:
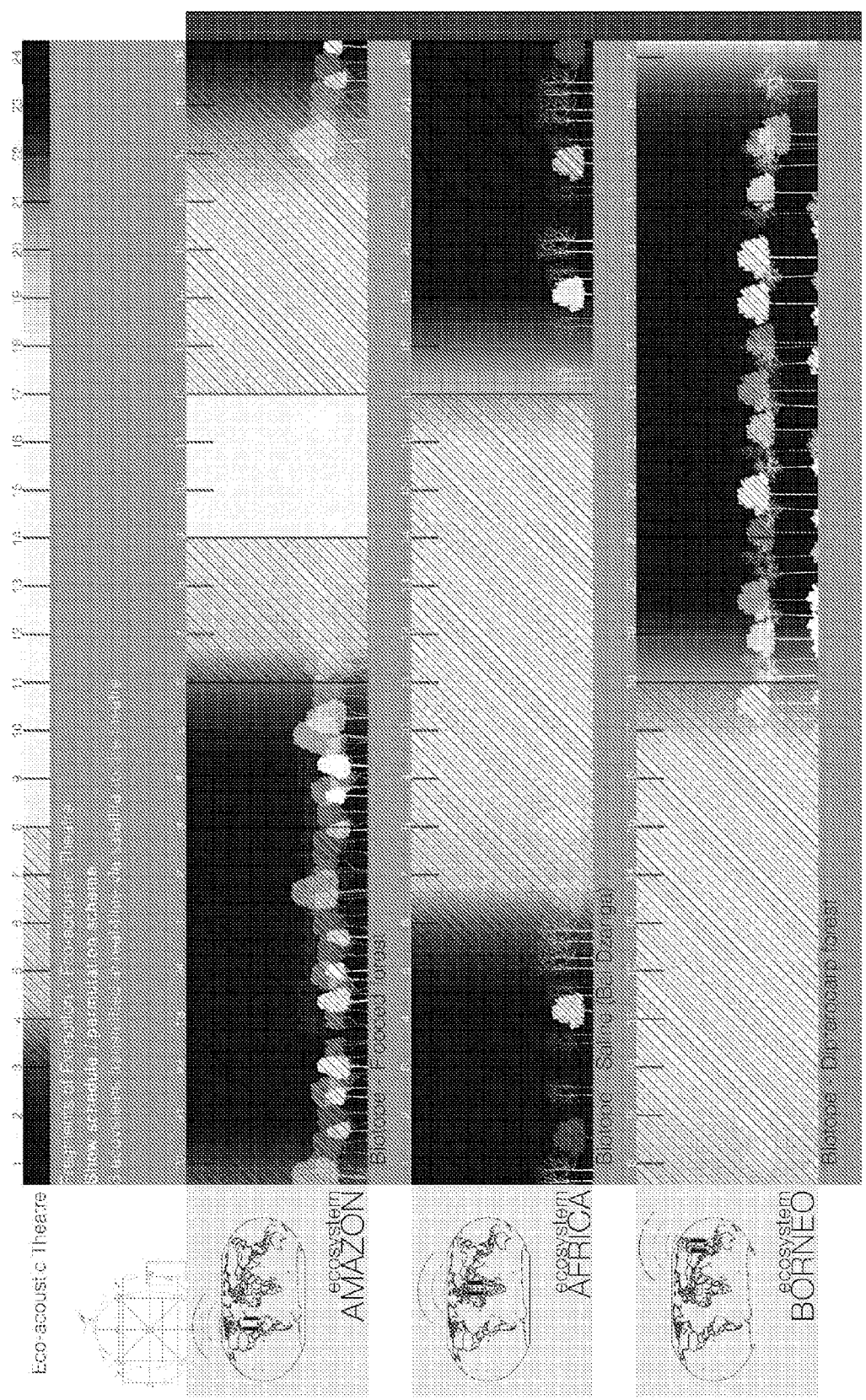
FIG. 15 is a diagram of a hypothetical show schedule built on real-time transmissions from three different ecosystems.

Therefore, the theatre (100) receives via satellite or via internet all of the sound contents from the three primary rainforests of the world where the microphone systems have been arranged. The first microphone system will be set in Amazonia in the Yasuni park in Ecuador (FIG. 15a), the second in Africa in the Dzanga-Sangha reserve in the Republic of Central Africa (FIG. 15b), the third in Borneo from the natural park of Mulu in Sarawak (FIG. 15 c). A complex show schedule takes into account the different time zones and the most important biophonic moments, and alternatively switches among the three principle real-time transmissions (15).

Spectrographic analyses in real time (axis x=time; axis y=frequency; the color=sound energy) projected on the annular screen (6) around the spectators, guide the listening experience of the audience in the theatre (100). The spectrogram therefore constitutes an intuitive and extremely powerful educational method to understand, through the visuals, the complexity of the ecosystem sounds. The coexistence of a great number of species and individuals of the same species is in fact a characteristic of the primary equatorial rainforests where the acoustic field is subdivided into frequency and temporal niches. These niches are representative of an evolutionary strategy of ecosystems development and are clearly visible in the spectrograms.

In the theatre (100) the projection (that derive from 4-6 projectors that are arranged at the center of a specific location) of the spectrograms running from left to right, make up a circular track that reflects the exact objective data in time; a true eco-acoustic score is built, where the visual window is constantly renewed, appearing from a conventional point at the extreme right, running along for the whole length of the 180° area, and disappearing at the extreme left in an interval of analysis of about 2 minutes.

The wide audience of a theatre (from 16 to 420 people according to the size option chosen) can in this way listen to the ecosystem sounds in extinction, through an immersive system of sound reconstruction, whether from optimized registrations, or by internet connections in real time of these ecosystems, and at the same time watching the sound structure by viewing the fascinating spectrograph projections.

Figure 16:
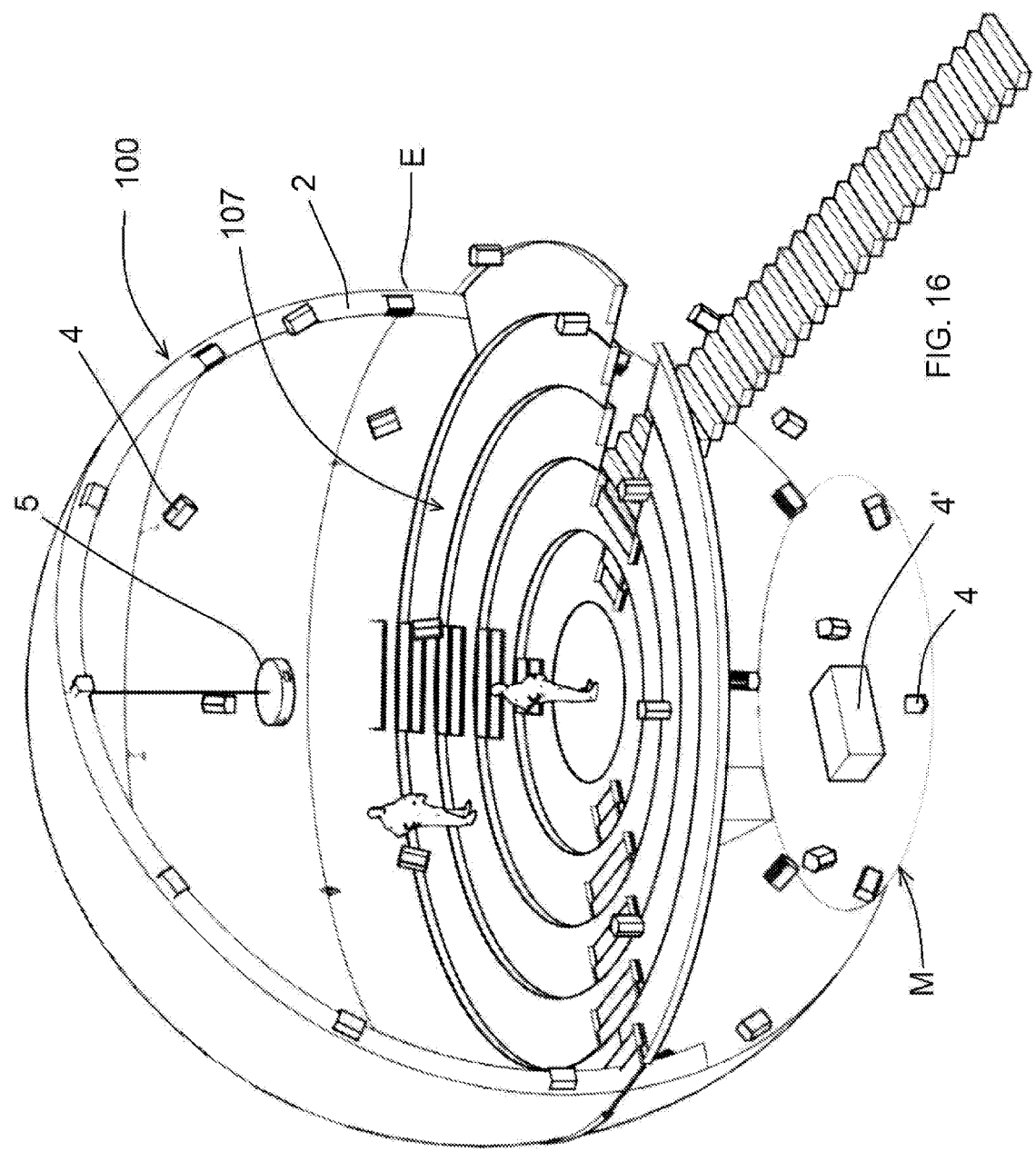
FIG. 16 is a schematic view in perspective, partially divided, illustrating a second possible version of the terraces, i.e. in the concave form.
Figure 17:
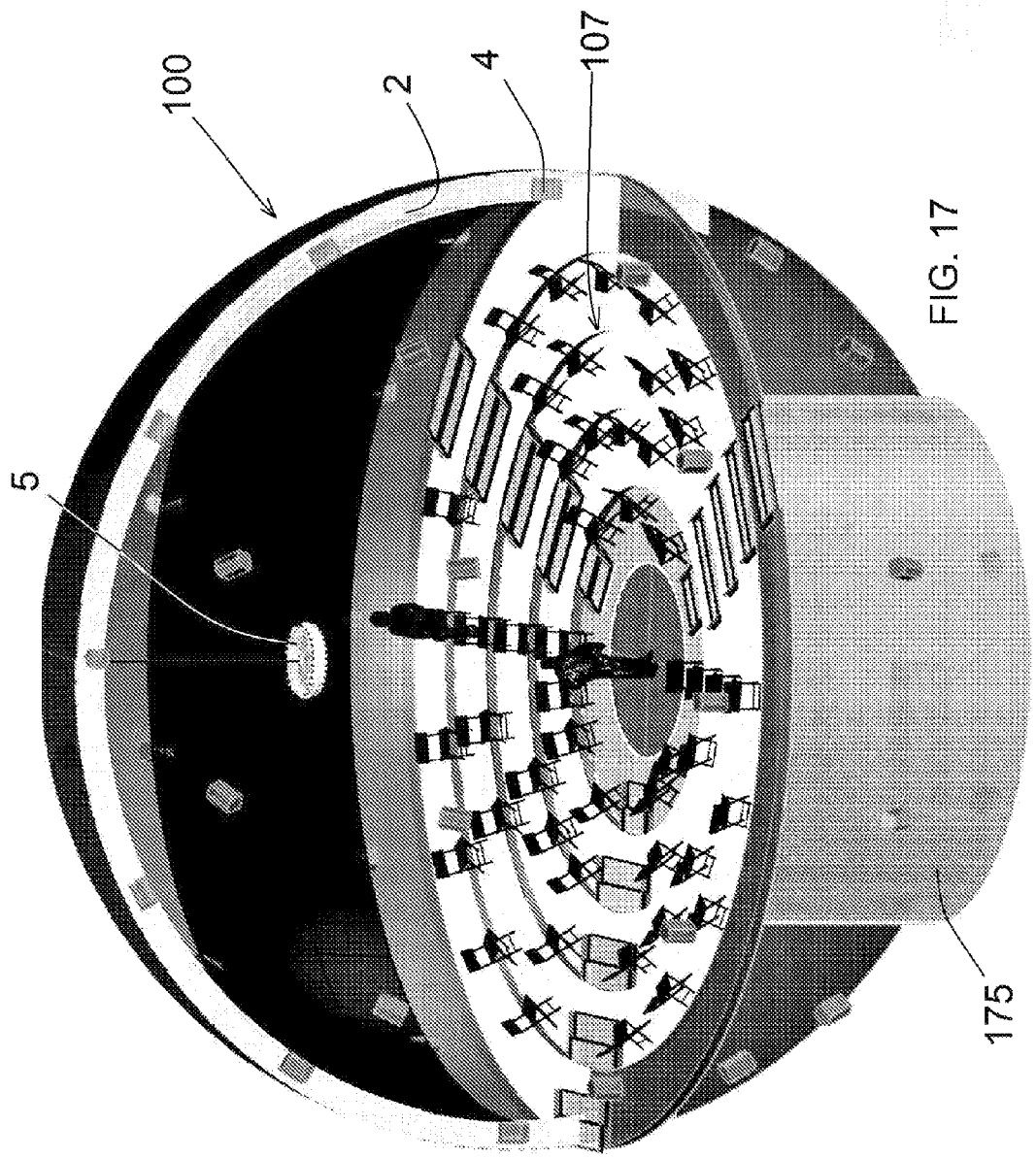
FIG. 17 is a view similar to FIG. 16, showing a support system for the concave version of the terraces.
Figure 18:
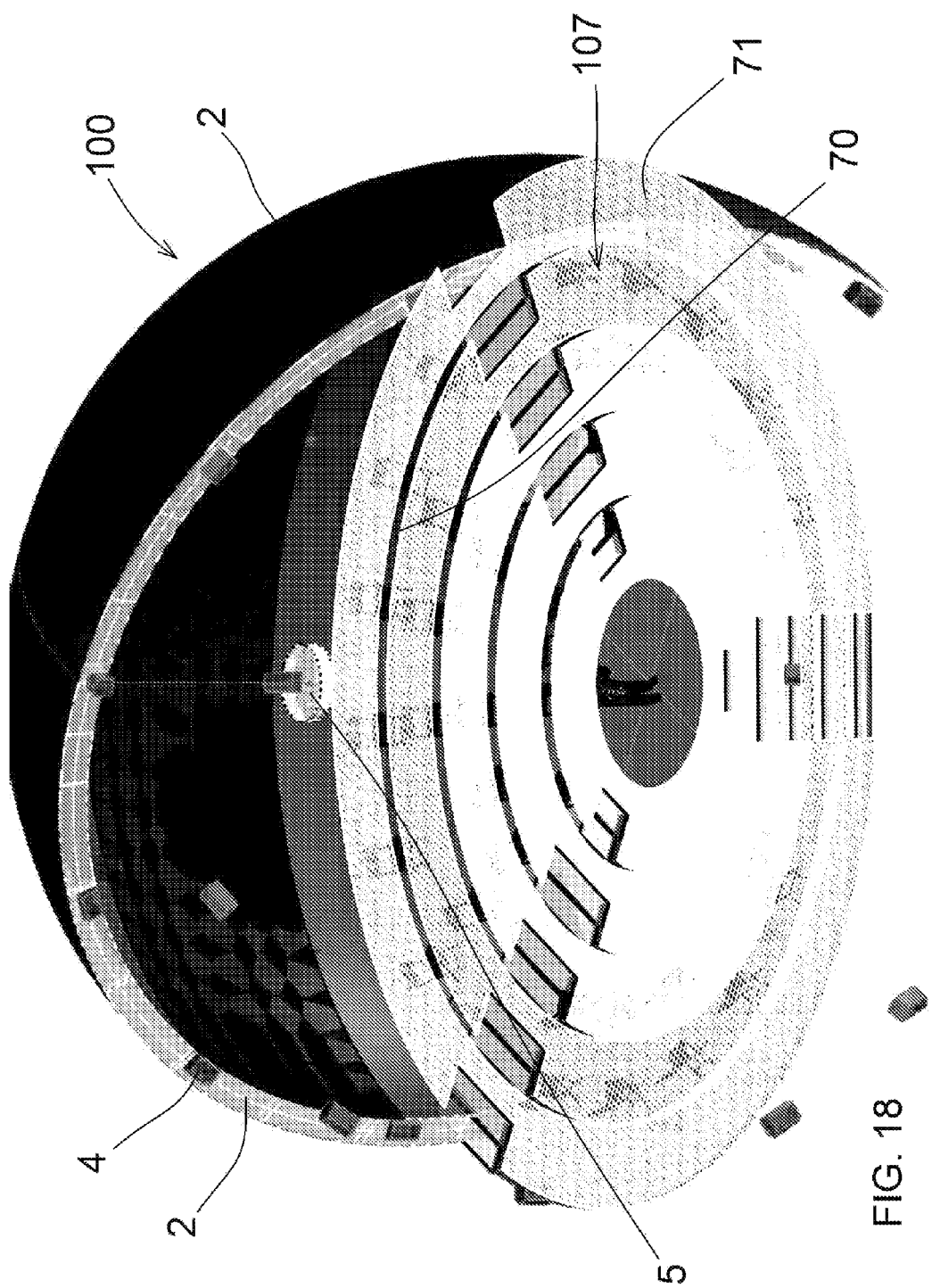
FIG. 18 is also a view similar to FIG. 16, with a variant to the concave form of the terraces.

Despite in FIGS. 1-13, for explanatory reasons, there are diagrams of the terraces with a convex form and concentric cylindrical steps (7) with decreasing diameter towards the upper part, in FIGS. 16, 17 and 18 there are illustrations of construction versions of the terraces in concave form, with concentric cylindrical steps (107) with a decreasing diameter towards the bottom part.

The term terraces is intended to mean rings of steps on which the spectator can sit, stand or walk. Chairs can be placed on these terraces to accommodate the user.

In reference to FIGS. 16 and 19, for the concave terraces, the spherical supporting structure (2) is cut off by a horizontal plane at a latitude of less than −20° south of the equator (E). In this particular case the sphere is cut off by the plane (M) at a latitude of about −60° below the equator (E). In this situation the upper cylindrical step of the concave terracing (107) is found slightly below the equator (E) so that the heads of the spectators (standing or seated) are positioned as nearly as possible to the level of the equator (E) of the sphere. The other steps, having a decreasing diameter towards the base, are below the equator level (E). The base is a suitable arena for placing the electroacoustic performer.

Below the terraces (107) the speakers are positioned (4) as well as a subwoofer type speaker (4') of a larger dimension.

In reference to FIG. 17, as support for the concave terraces (107), a structure is provided (175) made up of cylindrical perforated metal grates with an axis which coincides with the vertical axis passing through the north pole of the sphere. This type of support (175) allows for a perfect transmission of sound.

In reference to FIG. 18, in this mode of realization both the steps (70) and the seats or walking surfaces (71) of the terraces are made of perforated grates in order for the sound to propagate.

Obviously the same perforated grates can be used for the convex terrace version as well, see FIGS. 1 and 13.

To the present the invention variations, contingent to its practical implementation, can be made by a qualified technician in the field, without departing from the scope of the invention.

The invention claimed is:

1. An eco-acoustic theater comprising:
   a support structure supporting an external sound-proof cover and an internal sound-absorbent cover, wherein the internal sound-absorbent cover forms a truncated sphere having a horizontal plane;
   a plurality of terraces located inside the support structure, wherein the plurality of terraces include substantially cylindrical concentric steps, and wherein each substantially cylindrical concentric step has an axis that coincides with a vertical axis passing a pole of the truncated sphere;
   an annular screen located inside the support structure, wherein the annular screen surrounds the plurality of terraces;
   a plurality of speakers located inside the support structure, wherein the plurality of speakers are configured to direct three-dimensional sound signals towards the plurality of terraces; and
   a set of projectors located within the support structure, wherein the set of projectors are configured to project a spectrogram of the sound signals emitted by the loudspeakers towards the annular screen.

2. The theater of claim 1, wherein at least one of the plurality of projectors is fixed to the support structure.

3. The theater of claim 1, wherein at least one of the plurality of speakers is fixed to the support structure.

4. The theater of claim 1, wherein the three dimensional sound signals reconstruct one of: real natural soundscapes or composed environments.

5. The theater of claim 1, wherein the truncated sphere is truncated with a horizontal plane having a latitude equal to or less than −20° south of an equator of the sphere.

6. The theater of claim 1, wherein the external sound-proof cover comprises sheet metal panels and the internal sound-absorbent cover comprises panels of open-cell porous sound-absorbent material.

7. The theater of claim 1, wherein at least one of the plurality of speakers is embedded in the sound-absorbent cover.

8. The theater of claim 1, wherein the plurality of speakers are embedded in the sound-absorbent cover and positioned equidistantly from a center of the truncated sphere.

9. The theater of claim 8, wherein the plurality of speakers are arranged in a plurality of planes parallel to the horizontal plane, and wherein the plurality of planes are horizontally disposed equidistant from each other.

10. The theater of claim 9, further including a speaker fixed to the support structure at the pole of the truncated sphere.

11. The theater of claim 1, wherein the annular screen is located along an equator of the truncated sphere.

12. The theater of claim 1, wherein the annular screen is micro-perforated to allow for transmission of sound from at least one of the plurality of speakers.

13. The theater of claim 1, wherein the plurality of terraces are at least partially formed of a micro-perforated grate.

14. The theater of claim 1, wherein the plurality of terraces have a decreasing diameter in an upward direction.

* * * * *